US012152967B2

(12) United States Patent
Vana

(10) Patent No.: US 12,152,967 B2
(45) Date of Patent: Nov. 26, 2024

(54) AIRCRAFT ENGINE HEALTH MONITORING SYSTEM AND METHOD

(71) Applicant: Borealis Technical Limited, North Plains, OR (US)

(72) Inventor: Jan Vana, Prague (CZ)

(73) Assignee: Borealis Technical Limited (IM)

(*) Notice: Subject to any disclaimer, the term of this patent is extended or adjusted under 35 U.S.C. 154(b) by 455 days.

(21) Appl. No.: 17/520,030

(22) Filed: Nov. 5, 2021

(65) Prior Publication Data
US 2022/0146378 A1 May 12, 2022

Related U.S. Application Data

(60) Provisional application No. 63/110,566, filed on Nov. 6, 2020.

(51) Int. Cl.
G01N 1/22 (2006.01)
B64C 25/32 (2006.01)
B64C 25/34 (2006.01)
B64D 45/04 (2006.01)

(52) U.S. Cl.
CPC ........... G01N 1/2273 (2013.01); B64C 25/34 (2013.01); B64C 25/405 (2013.01); B64D 45/04 (2013.01)

(58) Field of Classification Search
CPC .... G01N 1/2273; G01N 1/2252; B64C 25/34; B64C 25/405; B64D 45/04
See application file for complete search history.

(56) References Cited

U.S. PATENT DOCUMENTS

| 6,405,975 B1* | 6/2002 | Sankrithi ............... B64D 47/08 244/50 |
| 10,035,609 B2 | 7/2018 | Ziarno |
| 10,964,221 B2 | 3/2021 | Vana |
| 2015/0051757 A1* | 2/2015 | Cox ....................... B64C 25/405 701/3 |
| 2016/0202168 A1* | 7/2016 | Knobloch ............... G01N 15/06 701/3 |
| 2017/0131185 A1* | 5/2017 | Koike ................. G01N 15/0656 |
| 2018/0321272 A1 | 11/2018 | Faroki et al. |

OTHER PUBLICATIONS

Masiol, M. & Harrison, R.M., Aircraft engine exhaust emissions and other airport-related contributions to ambient air pollution; Atmospheric Environment, vol. 95, Oct. 2014, pp. 409-455.

* cited by examiner

Primary Examiner — David Z Huang

(57) ABSTRACT

A system and method are provided that monitors ground level ambient air in an airport ground environment while aircraft equipped with electric taxi drive systems and ground level visual monitoring assemblies are driven with the electric taxi drive systems during ground travel. Monitoring assemblies with detection elements having configurations similar to pitot tubes modified with a sensor array are provided to generate data about components in the ground level ambient air identified to adversely affect aircraft engine health. The detection elements may be cooperatively mounted with the ground level visual monitoring assemblies. Ambient air flow is directed into the detection elements to contact the sensor array during electric taxi drive system-powered ground travel. Real time data related to the identified components generated by the sensor array is processed and analyzed, engine health is monitored, and a predictive scheduled of engine maintenance may be developed from the analyzed real time data.

19 Claims, 2 Drawing Sheets

AIRCRAFT ENGINE HEALTH MONITORING SYSTEM AND METHOD

TECHNICAL FIELD

The present invention relates generally to systems and methods for monitoring aircraft engine health to predict and plan engine maintenance and particularly to an improved system and method for monitoring aircraft engine health in aircraft driven during ground travel by electric taxi drive systems and using the data produced during monitoring to improve predictive maintenance of the aircraft engines.

BACKGROUND OF THE INVENTION

About 40% of an airline's aircraft maintenance costs may be directed to engine maintenance, and a large portion of the amount spent by airlines for maintenance, repair, and overhaul is for engines. One estimate predicts that aircraft maintenance, repair, and overhaul costs may reach $115 billion by 2028. Costs for engine overhauls, which are typically done after a set number of hours determined by the kind of engine and aircraft, are in the multiple millions of dollars. Airlines and aircraft maintenance, repair, and overhaul organizations have proposed various approaches directed to reducing engine and other maintenance costs and aircraft time out of service that may accompany maintenance requirements. An engine health management app and service that allows constant digital monitoring of individual engines in an aircraft's fleet and determines the impact of individual components on the entire engine is available. New tools that facilitate maintenance, such as a stand that will measure nitrogen and hydraulic pressure in landing gear components without a need to jack the aircraft, have been proposed. Automating maintenance inspections using drones and robots has also been suggested. In addition, predictive maintenance, diagnostics, and engine health monitoring, supported by shared data, may enable airlines to minimize unscheduled groundings and operational interruptions due to engine and other maintenance.

Applicant and others have proposed moving aircraft during ground travel with electric taxi drive systems and without reliance on operation of aircraft engines and tow vehicles. Although not produced by the operation of electric taxi drive systems during ground travel, materials that may adversely affect engines and other aircraft components and increase maintenance needs are present in the ambient air of airport ground environments where aircraft are driven by electric taxi drive systems. Particulate matter from tire erosion, brake wear, runway dust re-suspension, and corrosion of aluminum alloys, for example, may be present in the airport ground environment ambient air. Deposits of these exemplary materials, while likely more common on aircraft wheels and undercarriages, may also, over time, be deposited on aircraft engine components and adversely affect engine operation and health. Foreign object debris (FOD), materials in the airport ground environment that are typically significantly larger than the aforementioned particulate matter, is recognized to cause damage to aircraft engines, as well as to other parts of an aircraft. FOD may be ingested in engines, become lodged in aircraft operating mechanisms, and cut tires. One estimate indicated that FOD may cause $4 billion in damage to engines and aircraft taken out of service each year. Most FOD incidents do not cause significant aircraft damage, and such incidents may not be submitted to the United States Federal Aviation Administration (FAA) database of incidents and accidents at airports. Nevertheless, the damage that is caused, particularly over time, may increase engine and aircraft maintenance needs and require affected aircraft to be taken out of service for repairs. Effectively monitoring aircraft engine health and developing a plan for predictive maintenance for the aircraft that avoids of minimizes such damage requires not only obtaining data relating to incidents and information on all substances and materials in the ambient air in an aircraft's ground travel environment likely to adversely affect engine health, but also making that data readily available at locations where the aircraft will be maintained.

The use of electric taxi drive systems to move aircraft during ground travel avoids engine damage due to engine ingestion of FOD, especially during breakaway situations. While engine health may be improved when ingestion of FOD is avoided, other materials and substances in the ambient air in an aircraft's ground environment may also adversely affect engine health. A need exists for a system and method that monitors the ambient air in the airport ground environment while an aircraft is moved on the ground by electric taxi drive systems to identify materials and substances in the ambient air known to adversely affect aircraft engine health and to generate real time data related to the identified substances and materials upon which predictive maintenance of the engine may be based.

SUMMARY OF THE INVENTION

It is a primary object of the present invention, therefore, to provide a system and method that monitors the ambient air in the airport ground environment while an aircraft is moved on the ground by electric taxi drive systems to identify materials and substances in the ambient air known to adversely affect aircraft engine health and to generate real time data related to the identified materials and substances upon which predictive maintenance of the engine may be based.

It is another object of the present invention to provide an engine health monitoring system and method for aircraft driven on the ground at an airport with electric taxi drive systems that identifies levels of substances in ambient air with adverse effects on engine health and generates data relevant to predictive maintenance for communication to engine maintenance, repair, and overhaul operations.

It is another object of the present invention to provide an engine health monitoring system for aircraft equipped with electric taxi drive systems for ground travel and with ground level visual monitoring assemblies that include detection elements that may be cooperatively mounted with the ground level visual monitoring assemblies to detect substances in the ambient air known to adversely affect engine health as the aircraft is driven with the electric taxi drive systems and to generate real time data with levels of the detected substances for analysis and communication to those with responsibility for maintenance of engine health.

It is an additional object of the present invention to provide a detection element that may be mounted in an aircraft location where it is operative to detect presence, concentrations, and other relevant information for identified substances present in ambient ground level air known to adversely affect engine health while the aircraft is moved with electric taxi drive systems during ground travel and to generate real time data for processing and analysis.

It is a further object of the present invention to provide a method that monitors aircraft engine health by analyzing ambient air during aircraft electric taxi drive system-powered ground travel to detect identified substances and materials known to adversely affect engine health while the aircraft is driven with the electric taxi drive systems, employing sensor array-supporting detection elements that may be cooperatively mounted with ground level visual monitoring assemblies to generate real time data related to detected identified substances and materials in the ambient air, to process and analyze the generated data, and to develop a schedule of predictive maintenance for the aircraft's engines based on the processed and analyzed data.

It is yet a further object of the present invention to provide a method that monitors engine health in aircraft equipped with electric taxi drive systems to power ground travel, generates data relating to engine health from ambient air as the aircraft is driven with the electric taxi drive systems, stores the generated data so it may be communicated to a maintenance, repair, and overhaul facility, and develops a schedule for predictive maintenance of the electric taxi drive system-driven aircraft's engines that minimizes engine maintenance costs and aircraft time out of service.

In accordance with the aforesaid objects, a system and method are provided that monitor the ambient air in the airport ground environment while an aircraft is moved on the ground by electric taxi drive systems to detect and identify substances and materials in the ambient air known to adversely affect aircraft engine health and to generate real time data related to the identified substances and materials upon which a schedule of predictive maintenance of the aircraft's engines may be based. Aircraft are equipped with landing gear wheel-mounted electric taxi drive systems that drive the aircraft during ground travel without reliance on operating engines and attachment to tow vehicles. The aircraft may additionally be equipped with ground level visual monitoring assemblies, such as cameras and/or other visual information-providing devices, operative to provide visual information about the aircraft's adjacent ground level surroundings as the aircraft is driven on the ground with the electric taxi drive systems. Detection elements configured to contact a flow of ambient air and to detect identified substances and materials present in ambient air that are known to adversely affect engine health are provided and may be cooperatively mounted with the ground level visual monitoring assemblies so that the ambient air is directed to flow into the detection elements during aircraft ground travel. An array of sensors that detect the identified substances and materials are provided in the detection elements, and data transmission connections to a processor transmit real time data from the sensor array to a processor. The real time data is processed and analyzed and may be stored or further transmitted to an appropriate remote destination, which may be a maintenance, repair, and overhaul facility or an entity with responsibility for monitoring health of the equipped aircraft's engines for further analysis. Data generated from information produced by the sensors in the detection elements may be compiled to produce a history of aircraft engine exposure to the detected identified substances and materials during electric taxi drive system-powered ground travel, and the effect of exposure to the identified substances and materials may be monitored to develop a schedule of predictive maintenance for the aircraft's engines.

Additional objects and advantages will be apparent from the following description, claims, and drawings.

DESCRIPTION OF THE INVENTION

Figure 1:
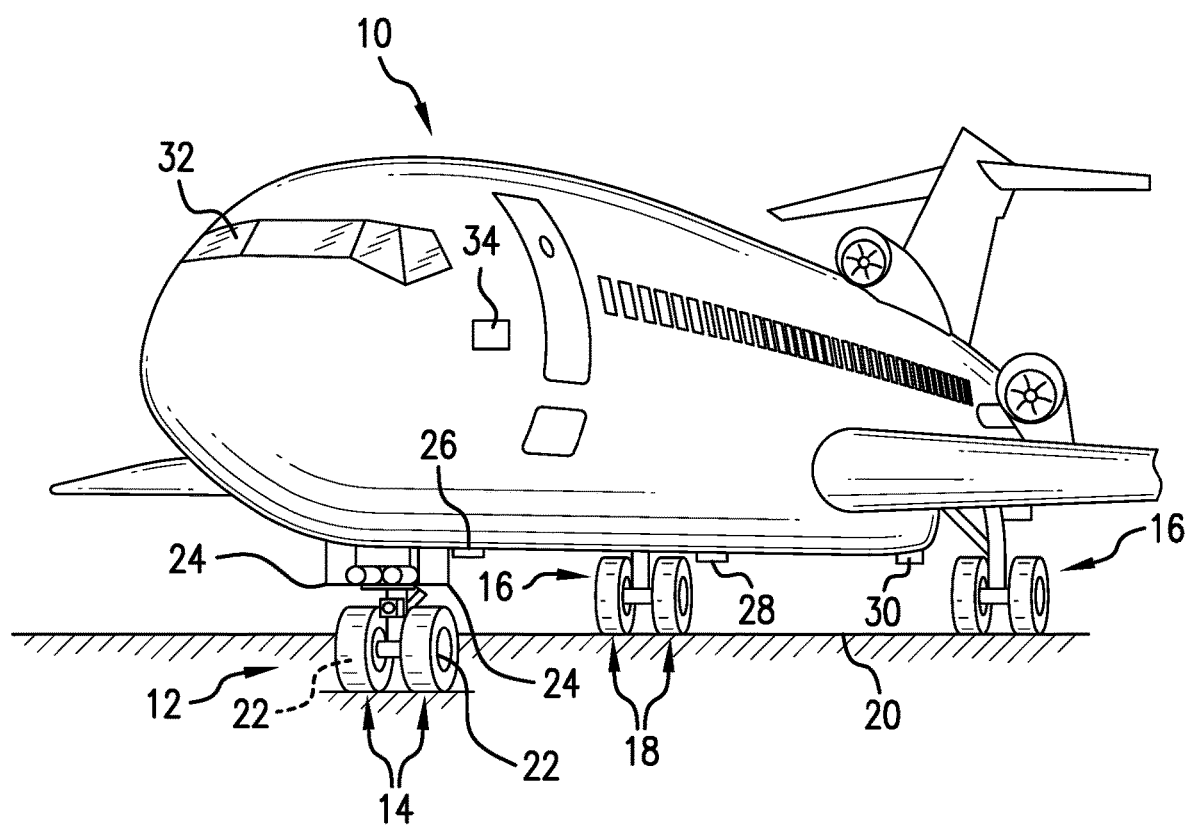
FIG. 1 illustrates a front and side perspective view of an aircraft equipped with electric taxi drive systems and with the ground level visual monitoring assemblies and the detection elements of the present invention.

Aircraft currently move into, out of, and within airport ramp environments that may be congested with other aircraft, ground service vehicles, and equipment. The ambient air in this congested ground level environment may be the source of environmental conditions, substances, and materials that may adversely impact aircraft engine health. At the present time, airport ramp areas and aircraft engines are monitored to determine levels of engine exhaust gases and combustion products so that engine operation may be adjusted to reduce engine emissions and improve air quality. Ambient air in an airport ramp area, however, is not currently monitored with an on-aircraft system that detects the presence of and determines concentrations and other information for identified substances and materials in the ambient air known to adversely affect aircraft engine health. The present invention provides an on-aircraft system and a method that monitors ambient air to detect and determine concentrations and other relevant information relating to such identified substances and materials. This system and method may be used on aircraft that are equipped with landing gear wheel-mounted electric taxi drive systems to power ground travel that may also be equipped with ground level visual monitoring assemblies operative to provide visual information about the aircraft's adjacent ground level environment as the aircraft is driven on the ground in the ramp area and elsewhere with the electric taxi drive systems.

"Electric taxi drive systems" and "electric taxi systems," as used herein, refer to pilot-controllable landing gear wheel-mounted drive systems used to drive aircraft independently of and without reliance on operation of aircraft main engines and tugs or external tow vehicles. Electric taxi drive systems may include landing gear wheel-mounted electric drive motors, gear or roller traction drive systems, clutches, and other components activatable to power landing gear wheels and drive the aircraft during ground travel in response to pilot control. An example of one electric taxi drive system developed by Applicant to drive an aircraft during ground travel without reliance on operation of the aircraft's main engines or attachment to tugs is described in commonly owned U.S. Pat. No. 10,308,352, the disclosure of which is fully incorporated herein in its entirety by reference. Other drive systems using drive motors that are not electric, including, for example, hydraulic or pneumatic drive motors, may also drive aircraft in connection with the system and method for monitoring the ambient air in the airport ground environment of the present invention and are contemplated to be included within the terms "electric taxi drive systems." An electric taxi drive system may be mounted completed within a volume defined by walls of a landing gear wheel in one or more nose or main landing gear wheels. In a preferred embodiment, electric taxi drive systems are mounted completely within defined wheel wall volumes in both nose landing gear wheels and are controlled by a pilot or flight crew from the aircraft cockpit with controls designed to operate the electric taxi drive system, power the nose landing gear wheels, and drive the aircraft during ground travel without reliance on the aircraft's main engines and external assistance from tugs. During electric taxi drive system-powered ground travel, aircraft engines are not operating, and adverse effects on aircraft engine health produced by engine ingestion of FOD may be avoided.

The terms "ramp" or "ramp area" are used herein to refer to the airside area at an airport that is intended to accommodate aircraft for the loading and unloading of passengers, mail, cargo, fueling, parking, or maintenance and is synonymous with the term "apron," which is also used to identify this area at an airport.

"Ground level visual monitoring assemblies," as used herein, provide visual information about an aircraft's adjacent ground level environment as the aircraft is driven on the ground with the electric taxi drive systems and may include camera assemblies specifically designed for aircraft use. Camera assemblies may be used alone or with other visual information-providing devices, for example LiDAR (light detection and ranging) or LADAR (laser detection and ranging) devices that may provide a three-dimensional field of view of a designated target area. Alternatively, a visual information-providing device other than a camera may be used alone in the ground level visual monitoring assemblies. Other visual information-providing devices, such as radar and the like, may also be used in the ground level visual monitoring assemblies. "LiDAR" as used herein is also intended to encompass "LIDAR," "LADAR," radar, and other visual information-providing devices. Applicant's commonly owned U.S. Pat. No. 10,964,221, issued 30 Mar. 2021, the disclosure of which is fully incorporated herein in its entirety by reference, describes such devices in connection with an aircraft collision avoidance system.

Referring to the Drawings, which are not drawn to scale, FIG. 1 illustrates, from a front and side perspective, an aircraft 10 equipped with the ambient air and engine health monitoring system of the present invention. The aircraft 10 has a nose landing gear 12 with a pair of tire-supporting wheels 14 and a pair of main landing gears 16, each with a pair of tire-supporting wheels 18; the aircraft is shown on a ground surface 20 in an airport ramp area. The aircraft 10 is equipped with pilot-controllable electric taxi drive systems that power aircraft ground movement without reliance on operating engines and tow vehicles. Each electric taxi drive system may include a pair of electric drive motors 22 mounted completely within the wheel volume in each nose landing gear wheel 14 shown on aircraft 10. One or more electric taxi drive systems (not shown) may also or alternatively be mounted within one or more of the main landing gear wheels 18. The electric taxi drive system is controlled by a pilot or the crew of the aircraft from the aircraft cockpit 32 to drive an arriving aircraft into the ramp area, maneuver the aircraft within the ramp area into a parking location, and drive a departing aircraft forward or in reverse out of the ramp area.

The nose landing gear 12 and the main landing gears 16 on the aircraft 10 are the retractable type of landing gears that are stowed in fuselage or wing wheel well compartments (not shown) while in the aircraft 10 is in flight. This removes the landing gears 12, 16 out of the aircraft's slipstream so that they maintain the aircraft's aerodynamic profile and do not cause parasitic drag during flight. Doors 24, which can be clearly seen on the nose landing gear 12, and are not seen, but are also present, on the main landing gears 16, open to allow the nose and main landing gears to extend upon landing so that tires (14, 18) on the tire-supporting wheels may contact the ground surface 20. To maintain the aircraft's aerodynamic profile, the landing gears are retracted after takeoff, and the doors are closed during flight.

The pilot and crew driving the aircraft 10 on the ground with the electric taxi drive system have a relatively limited view and cannot see all of the aircraft's exterior or all of the ramp area environment surrounding the aircraft from the cockpit 32. The aircraft may be equipped with a number of ground level visual monitoring assemblies, indicated schematically at 26, 28, and 30 on aircraft 10, to enable the pilot and crew to see portions of the aircraft's ground level exterior that are not visible from the cockpit 32. The ground level visual monitoring assemblies of the present invention may use cameras, including video cameras, and/or LiDAR visual information-providing devices, which may be scanning devices. A ground level visual monitoring assembly 26 may be positioned just aft of the wheel well of the nose landing gear 12, and/or another ground level visual monitoring assembly 28 may be positioned just aft of the main landing gears on the exterior of the aircraft fuselage. An additional location for a ground level visual monitoring assembly 30 may be under the aircraft tailskid; the tailskid is not clearly visible in FIG. 1. The ground level visual monitoring assemblies 26, 28, and 30 may be connected by wiring and/or other suitable connections to a source of power (not shown) and to a processor 34, shown schematically on aircraft 10. Ground level visual monitoring assemblies may also be positioned in other suitable locations on the exterior of aircraft 10.

Any structures on the aircraft fuselage exterior in the foregoing locations may be located in the aircraft slipstream, which requires the configurations of the ground level visual monitoring assemblies 26, 28, and 30 to be aerodynamic and not interfere with aircraft's slipstream. Another approach is to design the ground level visual monitoring assemblies 26, 28, and 30 with supporting structure that makes them extendible from and retractable into the fuselage so that they may be extended to function only during electric taxi drive system-powered aircraft ground movement and retracted during flight. An aerodynamically configured fairing or like structure (not shown) may be provided to cover the ground level visual monitoring assembly locations on the fuselage exterior during flight. The ground level visual monitoring assemblies may also be designed to be pop-down or pop-out devices that extend from the fuselage exterior when in use and are pulled back into the interior when not is use or when the aircraft is in flight.

Figure 2:
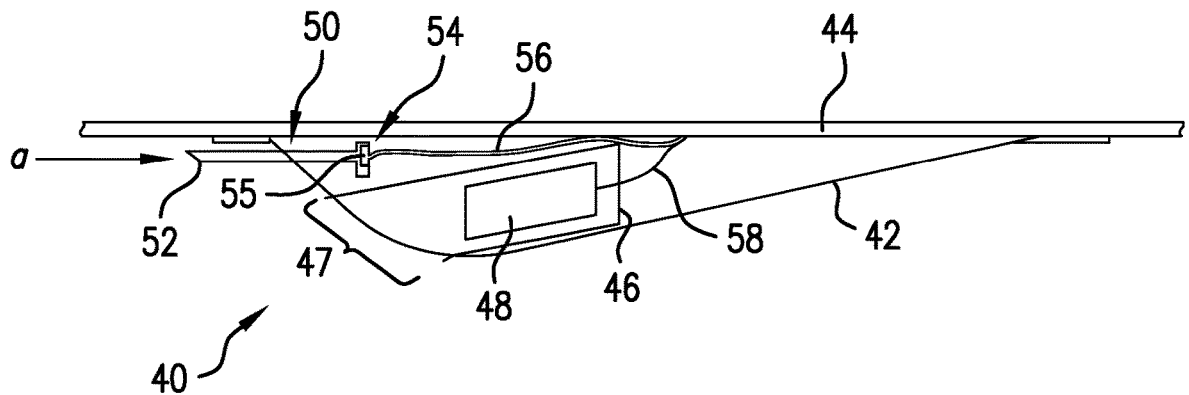
FIG. 2 is a schematic illustration of one embodiment of an aircraft ground level visual monitoring assembly with a detection element supporting a sensor array cooperatively mounted with the ground level visual monitoring assembly in an orientation that directs a flow of ambient air to the sensor array in accordance with the present invention.

FIG. 2 shows one embodiment of a ground level visual monitoring assembly 40 that has been modified for use with the engine health monitoring system of the present invention. The ground level visual monitoring assembly 40 is intended to be mounted on the external surface of the underside of an aircraft fuselage, such as where the ground level visual monitoring assemblies 26, 28, and 30 are shown in FIG. 1. A frame 42, which has an aerodynamic form, is attached to the aircraft fuselage skin 44 with suitable attachment devices (not shown). This embodiment may be permanently positioned to extend from the aircraft surface. Other aerodynamic forms besides the one shown may be used. This embodiment may additionally be modified so that the frame 42 pivots between the position exterior to the aircraft fuselage shown and a position inside the fuselage interior. As noted above, in an additional embodiment, the ground level visual monitoring assemblies 26, 28, and 30 may have a "pop-out" or "pop-down" configuration that extends from and retracts into the aircraft fuselage interior. An exterior form of the frame 42 that is less aerodynamic than that shown may be covered with an aerodynamic fairing or the like.

A housing 46 may be provided to support a camera, a video camera, a scanning LiDAR device, and/or another visual information-providing device 48 within the frame 42. Depending on the device, a housing 46 may not be required. A section of the frame 42, indicated by the bracket 47, may be formed of a transparent material to enable the camera, LiDAR device, or other visual information-providing device to remain protected within the frame 42 and still "see" the area to be visualized. The housing 46 and visual information-providing device 48 in FIG. 2 are schematic representations. Both may have different shapes and/or configurations than that shown. A separate housing may not be needed for some visual information-providing devices.

FIG. 2 shows one embodiment of a single detection element 50 mounted through the frame 42 so that an ambient air intake end 52 protrudes through the frame 42 to be in contact with the flow of ambient air surrounding the aircraft 10, represented by arrow a, around the ground level visual monitoring assembly. An opposite sensor end 54 of the detection element 50 supports a sensor array 55 that may include a single sensor or multiple sensors programmed to detect one or more identified substances or materials in the ambient air. The identified substances or materials to be detected are preferably those substances and materials whose presence in the ambient air is known to adversely affect aircraft engine health. Power and signal wires 56 may extend from the sensor end 54 of the detection element 50 and may join with wires 58 from the camera, LiDAR device, or other visual information-providing device 48, for example to connect with a processor, such as processor 34 in FIG. 1. Alternatively, a common power and signal wire (not shown) may be provided for both the detection element 50 and the visual information-providing device 48. Additional locations for the detection element 50 may also be appropriate, depending on the configuration of the frame 42. The intake end 52 of the detection element 50 must be positioned so that ambient air flows into the detection element while the aircraft is moving. As noted, the arrow a represents the direction of the flow of ambient air into the intake end of the detection element 50.

As the aircraft 10 is driven on the ground with the electric taxi drive systems, ambient air surrounding and contacting the aircraft flows into the intake end 52 of the detection element 50 and is directed to the sensor end 54 to contact the sensor array 55. The sensor array is programmed to detect, in real time, the presence and other desired information related to any of the identified substances or materials in the flow of ambient air in the detection element. The system may be programmed to detect concentrations of identified substances and materials, as well as any other information that may relate to effects of the identified substances and materials on engine health.

One or more of the ground level visual monitoring assemblies 26, 28, and 30 may be modified to support one or more detection elements 50 so that real time data from information produced by the sensor array 55 may be transmitted to and generated by the processor 34. It is contemplated that at least the ground level visual monitoring assembly 26 located closest to the aircraft nose will be modified to support a detection element 50. Although only a single detection element 50 is shown, multiple detection elements may be provided in a single ground level visual monitoring assembly.

It is also contemplated that detection elements 50 may be modified to be mounted in locations on the aircraft other than in the cooperative mounting with a ground visual monitoring assembly as shown in FIG. 2. Advantageously, mounting a detection element within a ground level visual monitoring assembly 40, as shown in FIG. 2, provides a protected environment for the detection element sensor end 54 and the sensor array 55, as well any power and wire transmission connections.

It is further contemplated that the numbers of different sensors in the sensor array 55 may be varied, depending in part on the number of detection elements 50 used. As noted, the sensor array may have a single sensor or multiple sensors. If only one or a small number of detection elements are used, the sensor array may have multiple sensors, while if a large number of detection elements are used, each detection element may have a single sensor in the sensor arrays.

Figure 3:
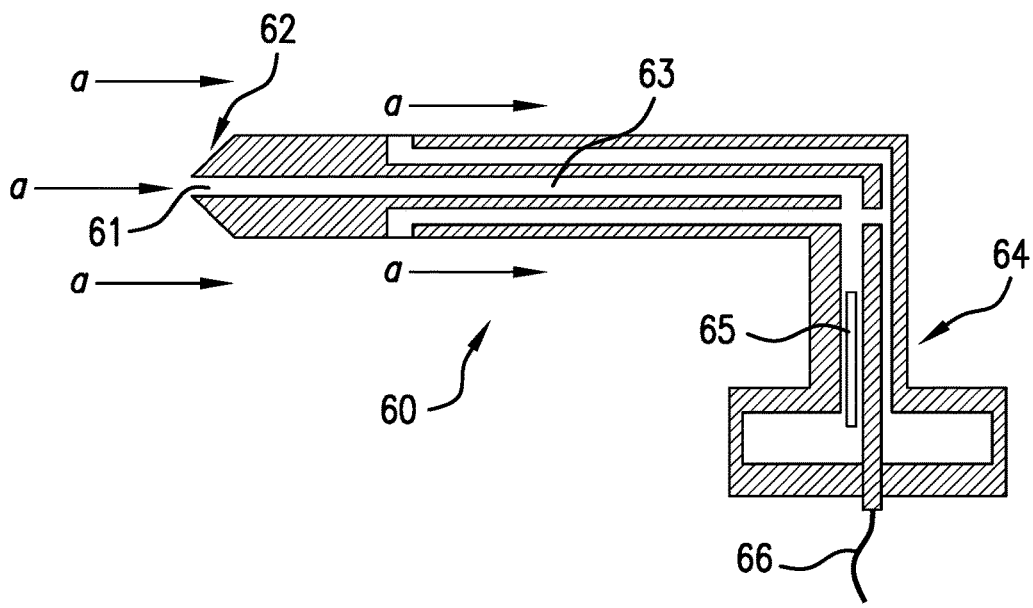
FIG. 3 is a schematic illustration of another embodiment of a detection element configured to intake a flow of ambient air and direct the ambient airflow to contact a sensor array and monitor the ambient air in an airport ground environment to detect and identify substances and materials known to adversely affect aircraft engine health in accordance with the system and method of the present invention.

The detection element may be a pitot type tube that has been modified to mount an array of sensors within an end of the pitot type tube. FIG. 3 illustrates schematically one kind of pitot tube 60 that may be modified to form a second embodiment of a detection element useful in the engine health monitoring system and method of the present invention. In this embodiment, ambient air flow, represented by arrows a, enters a channel 63 through an opening 61 in the detection element intake end 62. The airflow is directed to contact a sensor array 65 in a sensor end 64 of the detection element 60. The detection element 60 may have a different configuration from that of detection element 50. A power and/or transmission wire 66 is provided and may, like the wire 56 in detection element 50, be a common power and signal wire for the detection element 60 and a camera, LiDAR device, or other visual information-providing device. Other designs of pitot type tubes that can direct a flow of the ambient air produced as an aircraft is driven on the ground with electric taxi drive systems into the tube to contact a sensor array and that can be mounted in a ground level visual monitoring assembly or on an aircraft exterior surface as shown and described herein may also be modified to function as a detection element in accordance with the present invention.

The ambient airflow directed into the detection element (50, 60) to contact the sensor array (55, 65) may be analyzed to produce a range of information relating potential effects on engine health. As noted above, the presence of identified substances and materials in the ambient air known to adversely affect aircraft engine health may be detected by the array of sensors, and specific individual sensors that detect specific ones of the identified substances and materials may be included in the array of sensors. Such substances and materials may include, for example, sand, dust, and particles from FOD, as well as corrosion-producing chemicals and deposit-producing chemicals. These substances, which may be present in ramp ambient air, may cause deterioration of engine performance over time. Physical distortion of engine parts may be caused by the cumulative effects of FOD, corrosion, erosion, and deposit build-up. It is contemplated that the ambient airflow will be analyzed for concentrations of selected ones of these substances and materials that have been established to produce the foregoing adverse effects. Ambient airflow may also be analyzed for air quality and for differences from standard meteorological conditions. Optimal engine operating parameters may be affected by barometric pressure, air moisture content, air temperature, and other environmental conditions. It is contemplated that sensors that detect these conditions in real time may be included in the array of sensors.

The real time data produced by the array of sensors (55, 65) may be transmitted to a processor, such as processor 34. The processor uses suitable analytical algorithms to process and analyze the real time data from the array of sensors and to generate information relating to the ambient air, for example to detect the presence of FOD and other substances and materials in the ambient air that will, over time, produce physical distortion of engine components and/or to determine the real time meteorological conditions that might adversely affect engine performance. The analyzed real time data obtained may be matched with other aircraft data, including that from the aircraft GPS, from time stamps, and from engine thrust. All of this, and other, aircraft environmental and matched data may be used to improve engine health monitoring and to develop schedules for engine predictive maintenance.

The engine health monitoring system and method of the present invention can enable airlines and maintenance, repair, and overhaul providers to collect and analyze unique environmental data in real time while an aircraft is being driven on the ground with the electric taxi drive systems. A history of diagnostic data may be produced for an aircraft that will facilitate the development of a schedule of predictive engine maintenance. When a history of diagnostic data, such as that possible with the system and method of the present invention, is available, and engine health monitoring and predictive maintenance are implemented, instances of unscheduled aircraft groundings and time out of service may be significantly minimized and potentially eliminated.

In accordance with the present method of monitoring engine health, an aircraft equipped with electric taxi drive systems for ground movement and with ground level visual monitoring assemblies is additionally equipped with detection elements, as described and shown in connection with FIGS. 2 and 3, that may be supported by modified ground level visual monitoring assemblies or mounted separately on the aircraft. Aircraft environmental meteorological information and ambient air composition information to be detected is identified, and sensors capable of detecting the identified information are provided in an array of sensors in one or more detection elements. The aircraft is driven with the electric taxi systems during ground travel, and a flow of ambient air is produced by the moving aircraft. This flow of ambient air is directed into the detection element and flows through the detection element to contact the array of sensors in real time as the aircraft moves. Information from the array of sensors is transmitted in real time to a processor, where the information is processed using analytical algorithms appropriate for the sensed information and analyzed to generate desired data. The desired data may include, for example, qualitative identification of substances and materials known to affect engine health in the ambient air, as well as quantitative information relating to concentrations of these substances and materials. Comparisons of airflow quality and differences from standard meteorological conditions may also be included in the desired data. The desired data obtained may be stored to produce a historical record for the aircraft. The data may also or alternatively be communicated to a maintenance, repair, and overhaul provider, if appropriate, and/or to others with responsibility for monitoring and maintaining engine health. Further, a schedule of predictive maintenance for the aircraft may be developed from historical or current data.

While the present invention has been described with respect to preferred embodiments, this is not intended to be limiting, and other arrangements and structures that perform the required functions are contemplated to be within the scope of the present invention.

INDUSTRIAL APPLICABILITY

The aircraft engine health monitoring system and method of the present invention will find its primary applicability in improving the generation and collection of data from ambient ground level air relating to aircraft engine health and in developing schedules of predictive maintenance from the data to avoid and minimize unscheduled engine maintenance and time out of service of the monitored aircraft.

The invention claimed is:

1. An on-aircraft system that monitors airport ramp area ground level ambient air to detect components known to adversely affect engine health during electric taxi drive system-powered aircraft ground travel in the airport ramp area and produces real time information relating to the detected components in the airport ramp ground level ambient air, comprising:
   a. an aircraft equipped with pilot-controllable landing gear wheel-mounted electric taxi drive systems operable to power aircraft ground movement and drive said equipped aircraft during ground travel within said airport ramp area;
   b. one or more ground level visual monitoring assemblies positioned and operable to provide views of said equipped aircraft's ramp ground level environment not visible from a cockpit of said equipped aircraft, each said ground level visual monitoring assembly mounted within a frame having an aerodynamic form attached to a ground facing external surface of said equipped aircraft;
   c. at least one detection element mounted cooperatively with each said ground level visual monitoring assembly within said frame, said detection element comprising an ambient air intake end positioned to protrude through said frame in fluid contact with said ramp area ground level ambient air and a sensor end opposite said intake end, said detection element being configured with a channel to direct a flow of said ramp area ground level ambient air through said detection element to a sensor array in said sensor end programmed to detect, in real time, information relating to one or more of said components known to adversely affect engine health present in said ramp area ground level ambient air and to generate real time data from said detected information; and
   d. a processor in data transmission connection with said sensor array operable with analytical algorithms to receive and analyze said generated real time data transmitted by said sensor array and to generate real time information relating to said detected known components in said ramp area ground level ambient air.

2. The system of claim 1, wherein each said detection element intake end is open to receive said flow of ramp area ground level ambient air, said sensor end is configured to support said sensor array, and a channel connecting said ambient air intake end and said sensor end is configured to direct a flow of said ramp area ground level ambient air through said detection element from said intake end to said sensor end to contact said sensor array, said sensor array being further programmed to detect at least presence and concentration of designated ones of said known components in said flow of ramp area ground level ambient air, to generate said real time data related to said designated ones of said identified components and to transmit said generated real time data to said processor.

3. The system of claim 2, wherein said sensor array comprises a single sensor programmed to detect and generate said real time data for a single known component detected in said ramp area ground level ambient air or multiple sensors, each of said multiple sensors being programmed to detect and generate said real time data for a different one of multiple known components detected in said ramp area ground level ambient air.

4. The system of claim 3, wherein said detection element further comprises one or more transmission wires connecting said single sensor or said sensor array to a power source and to said processor.

5. The system of claim 4, wherein each of said ground level visual monitoring assemblies and said cooperatively mounted detection elements share a common power and signal transmission wire connected to said power source and to said processor.

6. The system of claim 2, wherein said detection element channel has a linear configuration between said ambient air intake end and said sensor end, and said channel provides a linear flow of said ramp area ground level ambient air within said detection element along a linear path from said intake end to said sensor end to contact said sensor array.

7. The system of claim 2, wherein said detection element channel comprises a pitot type tube with a right angle configuration between said intake end and said sensor end formed by a linear intake portion adjacent to said intake end and a sensor portion oriented perpendicularly to said linear intake portion extending to said sensor end, and said channel being configured to direct a linear flow of said ramp area ground level ambient air into said intake end and along a linear path through said intake portion and to direct a right angle flow of said ramp area ground level ambient air from said intake portion along a right angle path through said sensor portion to contact said sensor array mounted in said sensor portion.

8. The system of claim 1, wherein said aerodynamic frame mounted on said aircraft ground facing surface forms an enclosed space with a housing enclosed within said aerodynamic frame supporting said ground level visual monitoring assembly within said housing positioned to obtain said view of said equipped aircraft's ramp ground level environment, and said detection element is supported by said aerodynamic frame with said ambient air intake end extending through said aerodynamic frame to be in said fluid contact with said ramp area ground level ambient air and with said sensor array located within said enclosed space.

9. The system of claim 8, wherein said ground level visual monitoring assembly supported by said housing comprises a camera, a video camera, or a scanning LiDAR device.

10. The system of claim 8, wherein said one or more ground level visual monitoring assemblies comprises a camera supported within said housing and a section of said aerodynamic frame forward of said camera is formed of a transparent material.

11. The system of claim 1, wherein said components known to adversely affect engine health present and detected in said flow of ramp area ground level ambient air comprise at least sand, dust, particles from tire erosion, brake wear, corrosion of aluminum alloys and FOD, corrosion-producing chemicals, deposit-producing chemicals, and moisture and said generated real time data and said real time information comprises at least concentrations of said detected known components in said flow of ramp area ambient air.

12. A method that monitors airport ramp area ground level ambient air to detect components known to adversely affect aircraft engine health during electric taxi drive system-powered ground travel in the airport ramp area, generates real time data for the detected components, and uses the generated real time data to develop a schedule of predictive maintenance that improves aircraft engine health, comprising:

a. providing an aircraft equipped with pilot-controllable landing gear wheel-mounted electric taxi drive systems operable to drive the aircraft during ground travel and providing one or more ground level visual monitoring assemblies positioned and operable to provide a views of the equipped aircraft's ramp area ground level environment not visible during ground travel from a cockpit of the equipped aircraft, and mounting each ground level visual monitoring assembly within a frame having an aerodynamic form attached to a ground-facing external surface of the equipped aircraft;

b. mounting at least one detection element having an ambient air intake end in direct contact with the ramp area ground level ambient air and in fluid communication through a channel with a sensor end cooperatively with at least one of the ground level visual monitoring assemblies within the aerodynamic frame with the ambient air intake end extending outside the aerodynamic frame in fluid contact with the ramp area ground level ambient air in the equipped aircraft's ground level environment and the sensor end positioned within the aerodynamic frame;

c. during electric taxi drive system-powered ground travel of the equipped aircraft, directing a flow of the ramp area ground level ambient air into the ambient air intake end of the detection element through the channel to contact a sensor array in the sensor end, detecting information relating to the known components in the ramp are ground level ambient air by the sensor array, and generating real time data about the detected known components from the detected information, as the equipped aircraft is driven with the electric taxi drive systems in the airport ramp area; and d. transmitting the generated real time data from the sensor array to a processor with analytical algorithms programmed to analyze the transmitted information and determine parameters of the detected known components in data transmission with the sensor array, analyzing the transmitted information, determining the parameters of the detected known components in the ramp area ground level ambient air in real time, and communicating information relating to the determined parameters of the detected known components to an engine maintenance service provider and developing a schedule of predictive maintenance that improves aircraft engine health or compiling the information relating to the determined parameters in a historical health record of the aircraft's engines.

13. The method of claim 12, further comprising programming the sensor array to detect composition information relating to the equipped aircraft's meteorological environment and ramp area ground level ambient air composition information, determining aircraft meteorological environment information and ramp area ground level ambient air composition information to be detected and identified in real time as the equipped aircraft is driven on the ground with the electric taxi drive systems, generating the real time meteorological and ramp area ground level ambient air composition information by the sensor array, transmitting the generated real time information to the processor, and analyzing aircraft engine health based on the generated aircraft meteorological environment and ramp area ground level ambient air composition information.

14. The method of claim 13, further comprising developing a schedule of predictive maintenance for engines on the equipped aircraft based on the analyzed aircraft engine health and the generated real time aircraft meteorological environment and ramp area ground level ambient air composition information.

15. The method of claim 12, further comprising communicating information relating to the determined parameters of the detected known components to an engine maintenance service provider and developing the schedule of predictive maintenance for engines on the equipped aircraft based on the communicated information.

16. The method of claim 12, further comprising compiling the information relating to the determined parameters of the detected known components in a historical health record of engines on the equipped aircraft and developing a schedule of predictive maintenance for the engines on the equipped aircraft based on the historical health record.

17. The method of claim 12, wherein the sensor array comprises a single sensor or a sensor array comprising multiple sensors, programming the single sensor to generate said real time data for a single detected known component in said ramp area ground level ambient air and programming each of the multiple sensors to generate real time data for a different one of multiple known components detected in the ramp area ground level ambient air, wherein the generated real time data comprises at least presence and concentration of the detected known components in the ramp area ground level ambient air while the equipped aircraft.

18. The method of claim 12, wherein the detection channel has a linear configuration and directing the flow of the ramp area ground level ambient air within the linear detection element channel along a linear path from the ambient air intake end to the sensor array in the sensor end.

19. The method of claim 12, further comprising providing a detection element comprising a pitot type tube with a channel, the pitot type tube having a right angle configuration between the ambient air intake end and the sensor end formed by a linear intake portion adjacent to the ambient air intake end and a sensor portion oriented perpendicularly to the linear intake portion extending to said sensor end, directing a linear flow of the ramp area ground level ambient air into the ambient air intake end and through the channel from the intake portion along a linear path to the sensor portion and then directing a right angle flow of the ramp area ground level ambient air along a right angle path through the channel to the sensor portion, and contacting the sensor array mounted in the sensor portion with the flow of the ramp area ground level ambient air.

* * * * *